(12) United States Patent
Ohnishi et al.

(10) Patent No.: US 7,258,207 B2
(45) Date of Patent: Aug. 21, 2007

(54) AUTOMATIC SHOE CLEARANCE ADJUSTING APPARATUS

(75) Inventors: Junichi Ohnishi, Nagoya (JP); Yoshihiro Tatsumi, Aichi-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 252 days.

(21) Appl. No.: 10/414,990

(22) Filed: Apr. 16, 2003

(65) Prior Publication Data

US 2003/0226729 A1 Dec. 11, 2003

(30) Foreign Application Priority Data

Apr. 16, 2002 (JP) ............................. 2002-113277

(51) Int. Cl.
*F16D 51/10* (2006.01)
*F16D 65/14* (2006.01)
*F16F 1/22* (2006.01)

(52) U.S. Cl. .............................. 188/79.52; 188/196 B; 267/164

(58) Field of Classification Search ............. 188/71.52, 188/71.53, 71.56, 71.55, 196 B, 196 BA, 188/79.52, 79.53, 79.55, 79.56; 257/158, 257/163, 164, 165
See application file for complete search history.

(56) References Cited

U.S. PATENT DOCUMENTS 4,148,380 A * 4/1979 Haraikawa ............... 188/79.52
4,385,681 A * 5/1983 Conrad et al. ........... 188/79.52
4,706,784 A * 11/1987 Shellhause ............... 188/79.52
4,729,457 A * 3/1988 Cousin et al. ........... 188/79.52
5,246,090 A * 9/1993 Quere et al. ............. 188/79.52
6,397,984 B1 * 6/2002 De Andreis et al. ..... 188/79.52

FOREIGN PATENT DOCUMENTS

| EP | 0 388 057 A | 9/1990 |
| EP | 388057 A1 * | 9/1990 |
| GB | WO/1994/12805 | 9/1994 |
| WO | WO 01/01008 | 1/2001 |
| WO | WO-03/025415 A | 3/2003 |

* cited by examiner

*Primary Examiner*—Xuan Lan Nguyen
(74) *Attorney, Agent, or Firm*—Apex Juris, PLLC; Tracy M. Heims

(57) ABSTRACT

An automatic shoe clearance adjustment apparatus having a ratchet wheel 124b and a driving member 127 comprising a pawl section 127f making a ratchet engagement with the ratchet wheel 124b and an arcuate leaf spring section 127e developing a resilient force for adjusting the automatic shoe clearance adjustment apparatus. The leaf spring section 127e is made of bi-metal. When the temperature of the leaf spring section 127e exceeds the predetermined degree, the arcuate leaf spring section 127e thermo-deflects so as to weaken the resilient force, thereby the automatic shoe clearance adjusting operation is suspended.

16 Claims, 7 Drawing Sheets

AUTOMATIC SHOE CLEARANCE ADJUSTING APPARATUS

BACKGROUND OF THE INVENTION

1. Field of the Invention

This invention relates to an automatic shoe clearance adjusting apparatus automatically adjusting a shoe-to-drum clearance existing between a brake drum and a brake shoe braking the brake drum by a frictional engagement therebetween. More particularly, this invention relates to an automatic shoe clearance adjusting apparatus with an automatic shoe clearance adjustment disabling mechanism suspending the automatic shoe clearance adjusting operation when the temperature of the drum brake exceeds a predetermined degree.

2. Description of Related Art

An example of a drum brake employing this type of automatic shoe clearance adjusting apparatus is fully described in PCT published application number WO 01/01008. An example of a construction of the automatic shoe clearance adjusting apparatus is explained with reference to FIGS. 6 and 7.

An automatic shoe clearance adjusting apparatus 22 is comprised of a strut 23, an automatic shoe clearance adjusting mechanism and an automatic shoe clearance adjustment disabling mechanism. The automatic shoe clearance adjusting mechanism automatically adjusts the shoe-to-drum clearance depending on the wear of the lining of the brake shoe (not shown in figures) and the automatic shoe clearance adjustment disabling mechanism suspends the automatic shoe clearance adjusting operation when the temperature of the drum brake exceeds a predetermined degree.

Components of the automatic shoe clearance adjusting apparatus 22 will be explained with reference to FIGS. 6 and 7, wherein terms "upper" and "lower" and terms "left" and "right" are given their ordinary meaning as suggested in FIG. 6.

The strut 23 is composed of a rotatable nut member 24, a fitting member 25 fitting into a left side portion of the nut member 24 to support the nut member 24 allowing relative rotation of the nut member 24 while non-rotatably engaging with a left brake shoe (not shown in the figures), and a bolt member 26 screwed into a right side portion of the nut member 24 to support the nut member 24 while non-rotatably engaging with a right brake shoe (not shown in the figures).

The nut member 24 is cylindrically shaped and structured such that a left side portion of the periphery on the nut member 24 is stepped to form a smaller diameter periphery 24e; a toothed ring with a ratchet wheel 24b force-fits onto a longitudinal left side of the small diameter periphery 24e; and an internal thread 24c is formed in a through hole 24d from a right side thereof.

The Y-shaped fitting member 25 is arranged such that a flat, plated section 25c at the left side thereof has an engagement groove to be engaged with the left brake shoe; and a stem section 25b at the right side thereof slidably fits into the through hole 24d of the nut member 24 from the left side.

The Y-shaped bolt member 26 is also arranged such that a flat, plated section 26b at the right side thereof has an engagement groove to be engaged with the right brake shoe; and an external thread 26a formed on the peripheral surface of a stem section 26c at the left side thereof is screwed into the internal thread 24c of the nut member 24 from the right side.

A driving member 27 is jointed to the strut 23 so as to implement the automatic shoe clearance adjusting mechanism and the automatic shoe clearance adjustment disabling mechanism.

The driving member 27 is designed such that a pawl element 29 made of bi-metal is fixed to an arcuate leaf spring element 28 made from a plate spring at an intermediate portion of the leaf spring element 28 between both ends 28a, 28c by a rivet 30.

The driving member 27 is jointed to the strut 23 by means of a bracket 31 and a sleeve 32 both installed on the strut 23. The bracket 31 having a proximal section 31a is securely attached to the fitting member 25 so that the proximal section 31a is being abutted against a stepped section 25a of the fitting member 25. The sleeve 32 is relatively rotatably fitted onto the small diameter periphery 24e and abuts against a stepped section 24a of the nut member 24 to prevent a rightward movement of the sleeve 32.

Thereafter, the toothed ring with the ratchet wheel 24b force-fits onto the small diameter periphery 24e of the nut member 24.

While the arcuate leaf spring element 28 is developing a resilient force acting to move the nut member 24 and the fitting member 25 apart from each other, the ends 28a, 28c thereof are hooked on the bracket 31 and the sleeve 32 respectively.

At that time, the tip of the pawl element 29 resiliently contacts to make a ratchet engagement with the ratchet wheel 24b of the nut member 24.

Operation of the automatic shoe clearance adjusting mechanism with the above configuration will be explained next.

Upon activating the service brake, a pair of brake shoes (not shown in the figures) move away from each other, an axial force acting on the strut 23 by a spring force of a shoe return spring located outside of the figures is released; the nut member 24 and the fitting member 25 are urged to move away from each other due to the resilient force developed by the arcuate leaf spring element 28 of the driving member 27; the nut member 24 moves rightward with the bolt member 26 and the fitting member 25 moves leftward; and the tip of the pawl element 29 moves in a direction to rotate the ratchet wheel 24b of the nut member 24 due to the extension of the arcuate leaf spring element 28. As the lining wears off and a traveling amount of the tip of the pawl element 29 exceeds one pitch of the ratchet wheel 24b, the nut member 24 is rotated for one tooth pitch relative to the ratchet wheel 24b to unthread the nut member 24 out from the bolt member 26 to extend the overall length of the strut 23, thereby automatically adjusting the shoe-to-drum clearance.

Operation of the automatic shoe clearance adjustment disabling mechanism will be explained next.

For example, frequent use of service brake on a down slope raises a brake drum temperature to cause lateral expansion of the brake drum. This expansion automatically enlarges the shoe-to-drum clearance just like being enlarged due to a general lining wear. However, if there is no special treatment for the enlargement created due to the temperature expansion, normal automatic shoe clearance adjusting operation is conducted to provide same type of shoe clearance adjustment as provided for the enlargement created due to the lining wear. Yet, if the brake drum is cooled down to the ordinary temperature, the expansion does not exist thereafter and the enlarged shoe-to-drum clearance is reduced to the extent that is previously enlarged due to the expansion. Accordingly, the ordinary automatic shoe clearance adjusting operation conducted while the expansion being existed becomes over-adjustment. Such over-adjustment might be a cause for dragging of the brake.

On the other hand, considering the expansion problem during the service brake operation, if the shoe-to-drum clearance is initially set larger, the brake stroke under the ordinary temperature becomes longer and thereby causing the driver to experience an unusual or disconcerting brake feeling.

For the purpose of resolving the above-identified problem, the pawl element 29 is made of bi-metal. Accordingly, as the brake drum temperature rises, the temperature of the pawl element 29 rises as well. The pawl element 29 is thermo-reflected, as shown in the two-dot chain line of FIG. 7. When the temperature of the pawl element 29 exceeds a predetermined degree, the bi-metal causes the pawl element 29 to move away from the ratchet wheel 24b, thereby suspending the automatic shoe clearance adjusting operation. This ultimately solves the problem of the shoe clearance over-adjustment.

The above-described conventional automatic shoe clearance adjusting apparatus has the following drawbacks.

While the shoe clearance adjustment disabling mechanism is operating, an axial force acting on the strut 23 is released and the bi-metal pawl element 29 is separated from the ratchet wheel 24b of the nut member 24. When this happens the nut member 24 becomes free without an external force acting thereon and this results in an irregular movement of the nut member 24, thereby possibly causing an adverse effect on the shoe-to-drum clearance.

Another adverse effect is that the driving member 27 requires more than minimum number of components. In the prior art driving member 27 comprises the arcuate leaf spring element 28, the bi-metal pawl element 29, and a joint means such as a rivet 30 so as to fix the two. More components are necessary if the bracket 31 and the sleeve 32 are provided for the purpose of fitting the driving member 27 on the strut 23. In addition, due to the excess number of components, forming the bracket 31 and the sleeve 32 requires more complex processing which in turn increases the manufacturing costs.

Accordingly, because of above-mentioned structure, assembling the components becomes complicated, thereby increasing the amount of the assembly task. Therefore, the manufacturing costs increases.

SUMMARY AND OBJECT OF THE INVENTION

This invention was made to improve and resolve the above-identified drawbacks by means of an automatic shoe clearance adjusting apparatus with a driving member which disable an automatic shoe clearance adjustment due to a thermo-deflection of an arcuate leaf spring element of the driving member when the temperature of the arcuate leaf spring of the driving member exceeds a predetermined degree, thereby eliminating the possibility causing the adverse effect on the shoe-to-drum clearance, facilitating designability, and improving the layout. Further, such an automatic shoe clearance adjusting apparatus requires fewer components and therefore increases its assembleability and thereby reducing the manufacturing costs.

In the main configuration of the above-described automatic shoe clearance adjusting apparatus for a motor vehicle drum brake, the automatic shoe clearance adjusting apparatus has a strut regulating the returning position of the pair of brake shoes and the driving member jointed to the strut. The strut comprises a rotatable nut member, a non-rotatable fitting member and a non-rotatable bolt member. The fitting member supports the nut member at one side portion of the nut member and the bolt member makes a screw engagement with the nut member at the other side portion of the nut member. The driving member comprises the arcuate leaf spring element and a pawl element. One end portion of the driving member is fixed to the fitting member and the other end portion thereof is rotatably engaged with the nut member. The nut member develops a resilient force urging the fitting member and the nut member away from each other in an axial direction of the strut. One end of the pawl element is integrated with the arcuate leaf spring element and the other end thereof makes a ratchet engagement with the ratchet wheel of the nut member.

The automatic shoe clearance adjusting apparatus has an automatic shoe clearance adjusting mechanism. This mechanism expands the strut to adjust the shoe-to-drum clearance by unthreading the nut member out from the bolt member when the fitting member and the nut member are separated while the pawl element makes a one-way-rotation of the nut member, due to the resilient force of the arcuate leaf spring element, when strokes of the brake shoes exceed a predetermined value while releasing an axial force acting on the strut.

Further, the automatic shoe clearance adjusting apparatus has an automatic shoe clearance adjustment disabling mechanism for suspending the automatic shoe clearance adjusting operation by weakening the resilient force of the arcuate leaf spring element upon thermo-deflecting the arcuate leaf spring element, when a temperature of the arcuate leaf spring element of the driving member exceeds a predetermined degree.

In another configuration, the automatic shoe clearance adjusting apparatus may be formed from a one piece sheet made of bi-metal shape memory effect alloy or any other type of thermo-sensitive material that has shape memory effects.

In another configuration, if a ratchet wheel is integrally formed on the nut member with a specified width in a longitudinal direction, the driving member is installed on the nut member by the process; fitting a tube section integrally formed on the driving member at the other end portion of the arcuate leaf spring element over a periphery of the nut member; sliding the tube section onto a peripheral groove formed on the periphery of the nut member; and making a protrusion by forging so that the protrusion fits into the peripheral groove allowing relative rotation therebetween.

In another configuration, the ratchet is integrally formed on an entire periphery of the nut member by withdrawing or extruding.

In another configuration, if the ratchet wheel is integrally formed on the entire periphery of the nut member, the driving member is installed on the nut member by the process; fitting inner circumferential teeth integrally formed on the other end of the arcuate leaf spring element on the ratchet wheel of the nut member; sliding the teeth onto a peripheral groove formed on the periphery of the nut member so as to cut the ratchet wheel into two separate sections; and forging the ratchet wheel so that a movement of the driving member in a direction toward the side portion of the nut member is prevented allowing relative rotation therebetween.

According to the above configuration, the driving member of the automatic shoe clearance adjusting apparatus provides the dual function of acting as an automatic shoe clearance adjusting mechanism and an automatic shoe clearance adjustment disabling mechanism, and therefore the automatic shoe clearance adjusting apparatus maintains an appropriately small shoe-to-drum clearance under ordinary temperature, regardless of its simple structure. This ensures a good brake action feeling.

When the temperature of the arcuate leaf spring element of the driving member exceeds a predetermined degree, the automatic shoe clearance adjustment disabling mechanism suspends the automatic shoe clearance adjusting operation by weakening the resilient force of arcuate leaf spring element due to the thermo-deflection of the arcuate leaf spring element. Therefore, the problem of the irregular movement of the nut member as explained above can be eliminated, thereby stabilizing the shoe-to-drum clearance. Further, designing the automatic shoe clearance adjustment disabling mechanism is facilitated because it is not necessary to manufacture a precise arcuate leaf spring element of the driving member.

If the driving member is formed from a one piece sheet made of thermo-sensitive material, the number of required components is reduced and therefore assembling the components is facilitated, thereby reducing the manufacturing costs. Further employment of a driving member made of a shape memory effect alloy improves designability compared to a bi-metal driving member.

Moreover, integral formation of the ratchet wheel on the nut member by withdrawing or extruding improves the processability.

Furthermore, if the ratchet wheel is integrally formed on the nut member with a specified width in a longitudinal direction by rolling, the tube section integrally formed on the driving member at the other end of the arcuate leaf spring element may fit over the periphery of the nut member allowing relative rotation therebetween and restricting relative movement in the longitudinal direction. On the other hand, if the ratchet wheel is integrally formed on the entire periphery of the nut member by withdrawing or extruding, the inner circumferential teeth integrally formed on the driving member at the other end of the arcuate leaf spring element may fit into the peripheral groove of the nut member so as to cut the ratchet wheel into two separate sections allowing relative rotation therebetween and restricting relative movement in the longitudinal direction. Either of the above-two installing methods for fitting the driving member over the nut member may simply be accomplished by forging.

In addition, the driving member is installed on the fitting member after utilizing a U-shaped end section integrally formed on one end portion of the driving member to resiliently hold a flat, plated section of the fitting member and making a convex-concave engagement to fix the position, thereby facilitating assembly of the driving member.

BRIEF DESCRIPTION OF THE DRAWINGS

A better understanding of the present invention will be had when reference is made to the accompanying drawings, wherein identical parts are identified by identical reference numbers and wherein.

DETAILED DESCRIPTION OF PREFERRED EMBODIMENT

Examples of an automatic shoe clearance adjusting apparatus relating to the present invention will be explained below while automatic shoe clearance adjusting operation is identical to the above-described conventional art whose explanation is omitted. Terms "upper" and lower and terms "left" and "right" describing every example of the present invention suggest directions based on partial cross-section plan views illustrating the automatic shoe clearance adjusting apparatus of each example.

Figure 1:
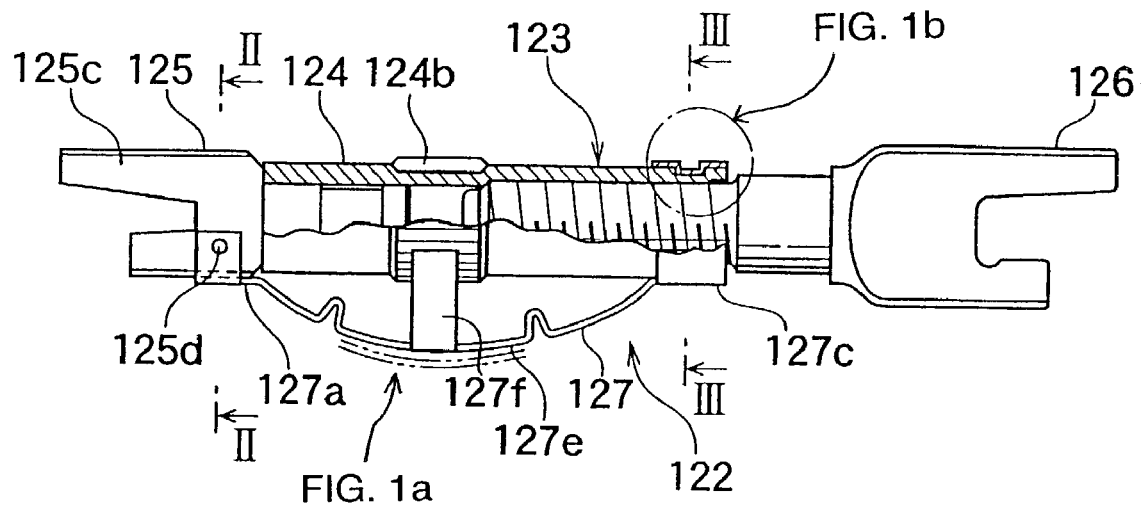
FIG. 1 is a partial cross-section plan view of the automatic shoe clearance adjusting apparatus relating to the first example of the present invention.
Figure 1A:
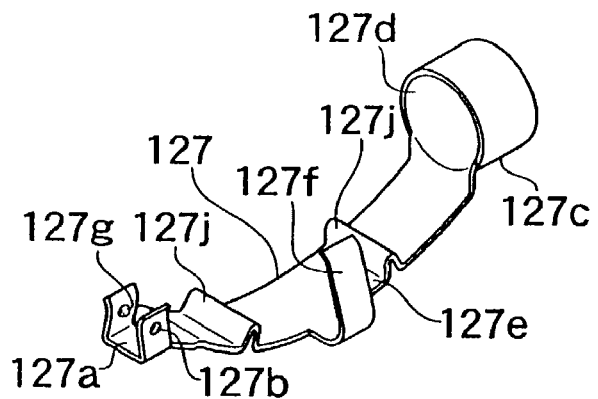
FIG. 1a is a perspective view of the driving member, a component of the automatic shoe clearance adjusting apparatus, before being jointed to the strut relating to the first example of the present invention.
Figure 1B:
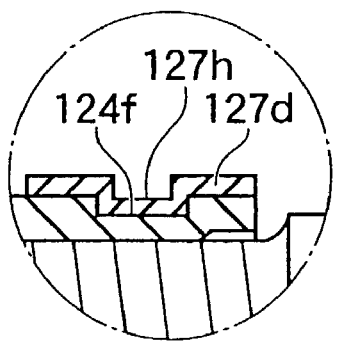
FIG. 1b is a partial, enlarged, cross-section view of the retention projections on the driving member and the peripheral groove on the nut member relating to the first example of the present invention.
Figure 2:
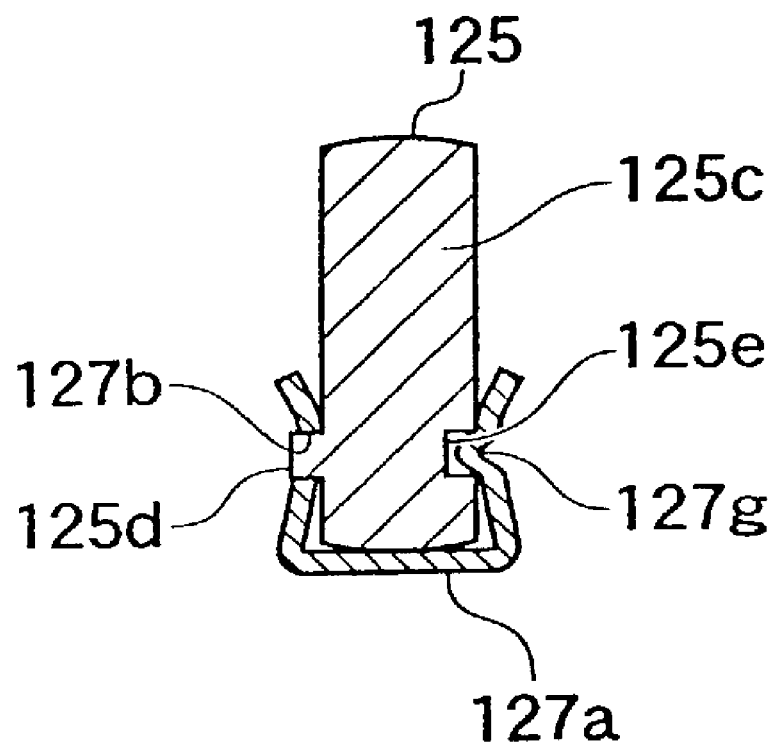
FIG. 2 is a cross-section view of FIG. 1 taken along the line II-II.

A first example of the present invention will be explained with reference to FIGS. 1-3. For the purpose of explanation, components with the same functions as described in the conventional art will be assigned reference numbers with 100s.

An automatic shoe clearance adjusting apparatus 122 of this example is comprised of four components, i.e., a nut member 124, a fitting member 125, a bolt member 126 and a driving member 127. The nut member 124, the fitting member 125 and the bolt member 126 compose a strut 123.

Figure 6:
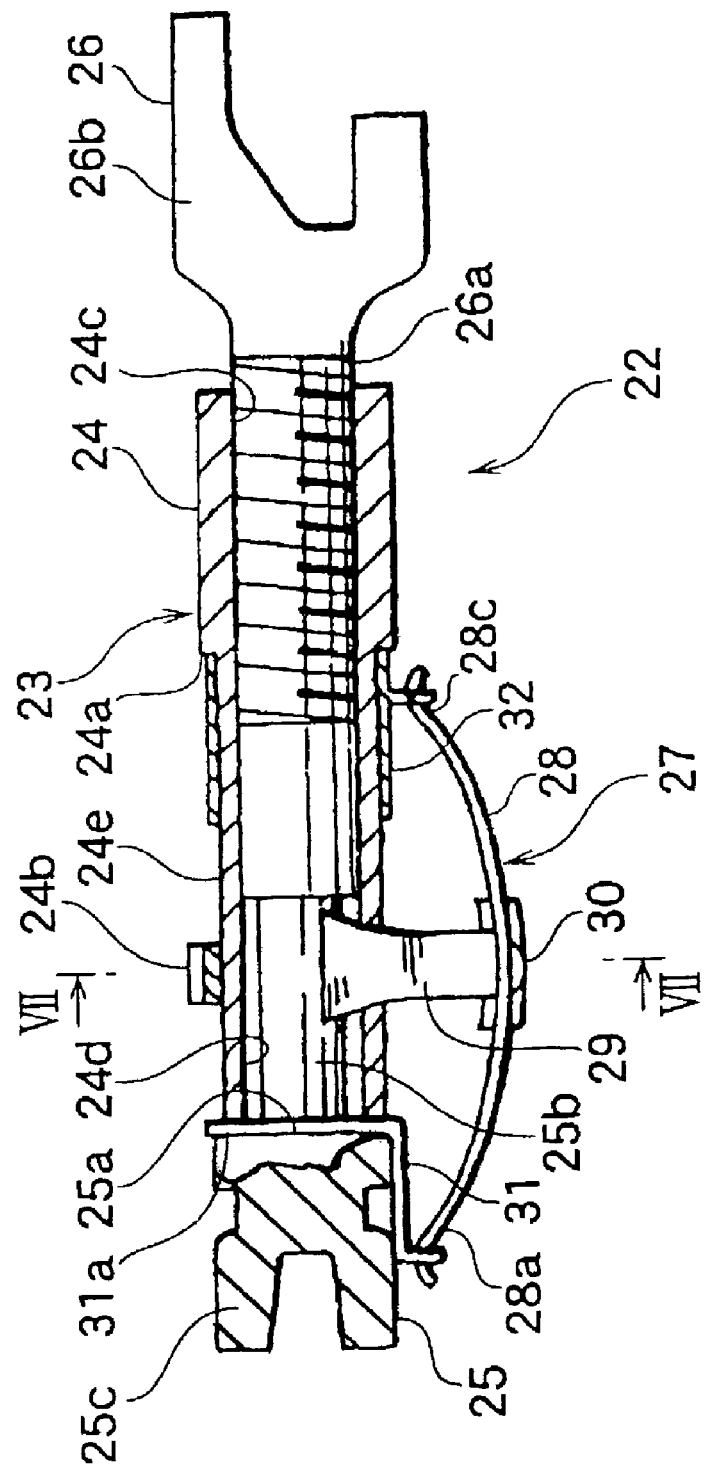
FIG. 6 is a partial cross-section plan view of the conventional automatic shoe clearance adjusting apparatus.
Figure 7:
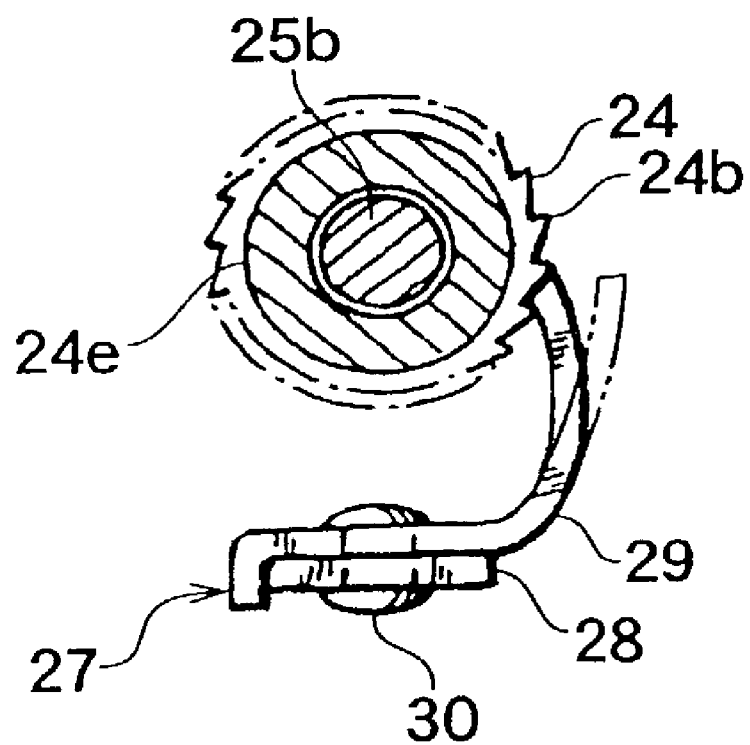
FIG. 7 is a cross-section view of FIG. 6 taken along the line VII-VII.

The nut member 124 has a cylindrical shape and has an integrally roll-formed ratchet wheel 124b somewhere around a left side of the cent region with a certain width relative to a longitudinal direction of the nut member 124. Integrally forming the ratchet wheel 124b is quite different from the conventional art shown in FIG. 6. In the prior art, an independent and separate ratchet wheel 24b is force-fitted onto the small diameter periphery 24e of the nut member 24.

The fitting member 125 is quite different from the conventional art in that a cylindrical projection 125d is press-formed on a flat, plated section 125c at the lower side.

The bolt member 126 is almost identical to the conventional an. The driving member 127 of the present invention employs a thermo-sensitive material such as bi-metal or shape memory effect alloy and is press-formed from a one piece sheet. A U-shaped end section 127a with a flat bottom integrally extends from a left end portion of the arcuate leaf spring section so as to resiliently hold the flat, plated section 125c of the fitting member 125. As shown In FIG. 2, the bottom of the U-shaped end section 127a abuts against an underside surface of the flat, plated section 125c; an opening 127b formed on one wall of the two facing walls of the U-shaped end section 127a fits onto the cylindrical projection 125d. Accordingly, the U-shaped end section 127a of the driving member 127 can be securely attached at a specified position on the fitting member 125. Also in this example, an engaging projection 1279 of the driving member 127, being fitted into an opening of a blind hole 125e press-formed simultaneously with the cylindrical projection 125d, projected from the other wall of the two facing walls of the U-shaped end section 127a. However, this is not prerequisite of this Invention. On the other hand, the cylindrical projection 125d of the flat, plated section 125c may be substituted for a blind hole where two projections may be projected from the two facing walls of the U-shaped end section 127a of the driving member 127 and thereby making a convex-concave engagement thereto.

A right end portion 127c of the driving member 127 is a cylindrical coupling 127d. The cylindrical coupling 127d may be formed such that a flat plate is drawn to the shape of a cup then the bottom surface is punched, thereby providing a precise internal diameter.

Figure 3:
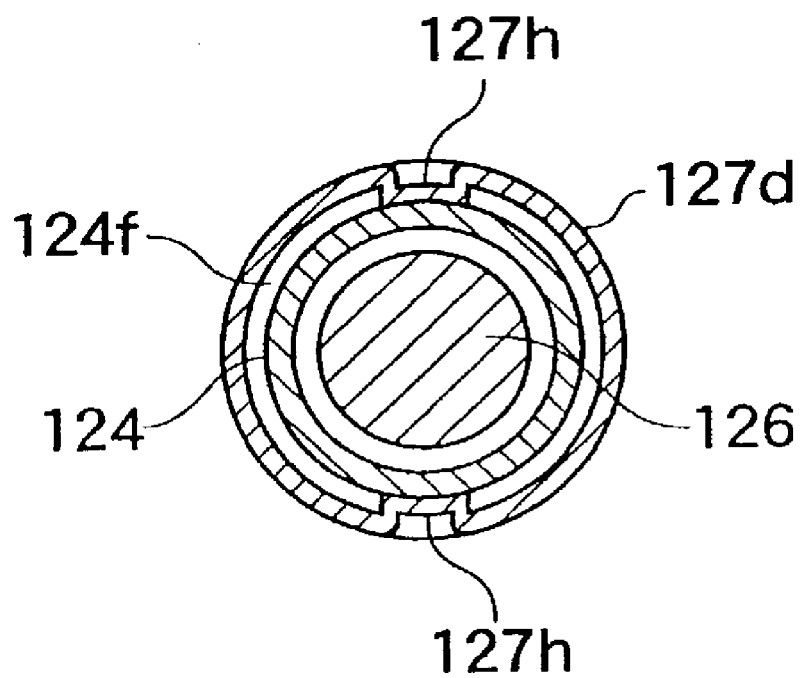
FIG. 3 is a cross-section view of FIG. 1 taken along the line III-III.

The driving member 127 is relatively rotatably jointed to a specified position of the nut member 124 in a manner that the cylindrical coupling 127d of the driving member 127 is slid to fit on a periphery of the nut member 124 from a right side, and as shown in FIG. 3, forged retention projections 127h are diagonally positioned on the cylindrical coupling 127d and are engaged to fit in a peripheral groove 124f on the nut member 124. Then, while an arcuate leaf spring section 127e is deflected slightly to a certain degree or magnitude, the facing walls at the U-shaped end section 127a are set to resiliently hold the flat, plated section 125c of the fitting member 125; then the opening 127b of the U-shaped end section 127a fits onto the cylindrical projection 125d of the flat, plated section 125c and the engaging projection 127g of the U-shaped end section 127a fits into the opening of the blind hole 125e. At that time a pawl section 127f, integrally extending from a side portion and at an intermediate portion of the arcuate leaf spring section 127e as section of the driving member 127, resiliently contacts to make a ratchet engagement with the ratchet wheel 124b of the nut member 124. In this example a pair of approximately U-shaped deflected spring sections 127j are provided on right and left sides of the arcuate leaf spring section 127e so as to lower the spring constant of the arcuate leaf spring section 127e. However, they are not a prerequisite of this invention. Further, two retention projections 127h on the cylindrical coupling 127d may be replaced with three or more intermittent projections positioned with equal intervals or a roll-formed tubular protuberance.

Operation of the above-described automatic shoe clearance adjustment disabling mechanism will be explained next, and the explanation regarding the driving member 127 is focused on a bi-metal driving member 127 because a thermo-deflected shape may be pre-designed in the case of using a shape memory effect alloy plate.

Thermo-deflection of the driving member 127 will be explained with reference to FIG. 1. When the temperature of the arcuate leaf spring section 127e of the driving member 127 exceeds a predetermined degree, the automatic shoe clearance adjustment disabling mechanism suspends the automatic shoe clearance adjusting operation so as to prevent over-adjustment of the shoe-to-drum clearance upon thermo-deflecting the leaf spring section 127e in a direction to reduce curvature of the leaf spring section 127e indicated in a fictitious line (a two-dot chain line of FIG. 1). At that time, the pawl section 127f of the driving member 127 moves downward and is thermo-deflected in a direction to increase a pressing force against the ratchet wheel 124b of the nut member 124. However, no adverse effect is acted on the automatic shoe clearance adjusting apparatus 122 because a resilient force separating the nut member 124 and the fitting member 125 away from each other is being released or substantially released.

According to a first example of the present invention, because the pawl section 127f of the driving member 127 constantly abuts against the ratchet wheel 124b of the nut member 124 even while the automatic shoe clearance adjustment disabling mechanism is operating, the irregular movement of the nut member 124 may be prevented, thereby eliminating the possibility of change in the shoe-to-drum clearance.

Further, the automatic shoe clearance adjusting apparatus 122 is comprised of four components, which is less than half of the conventional art with nine components, directly leading to facilitate the maintenance and assembly task, thereby drastically reducing the maintenance and assembly costs.

The ratchet wheel 124b of the nut member 124 is roll-formed on a peripheral surface of a rough-shaped nut member, thereby facilitating the forming of the ratchet wheel 124b. Furthermore, the diameter of the nut member 124 may be kept small, thereby facilitating brake layout.

The driving member 127 is formed from a one piece sheet made of bi-metal or shape memory effect alloy and may be pressed to form, thereby facilitating manufacture and allowing selection of materials according to a required design specification. For the purpose of jointing the driving member 127 to the nut member 124, the cylindrical coupling 127d of the driving member 127 is slid to fit on the peripheral surface of the nut member 124 and the forged, diagonally positioned retention projections 127h on the cylindrical coupling 127d are fit into the peripheral groove 124f of the nut member 124 allowing relative rotation of the two. However, the retention projections 127h may easily be press-formed without requiring any additional parts. The driving member 127 may be mounted on the fitting member 125 by deflecting the arcuate leaf spring section 127e of the driving member 127. The U-shaped end section 127a is slid on the flat, plated section 125a to resiliently attach therebetween, and the opening 127b and the engaging projection 127g, both on each facing walls, fit to the cylindrical projection 125d if the flat, plated section 125c and an opening of the blind hole 125e respectively, thereby facilitating the assembly task. Further, when the temperature of the arcuate leaf spring section 127e of the driving member 127 exceeds the predetermined degree, the automatic shoe clearance adjustment disabling mechanism suspends an automatic shoe clearance adjusting operation by weakening the resilient force of the leaf spring section 127e upon thermo-deflecting the leaf spring section 127e. Therefore, no manufacturing precision of the driving member 127 is necessary and the automatic shoe clearance adjusting operation may accurately be suspended under the predetermined temperature.

Figure 4:
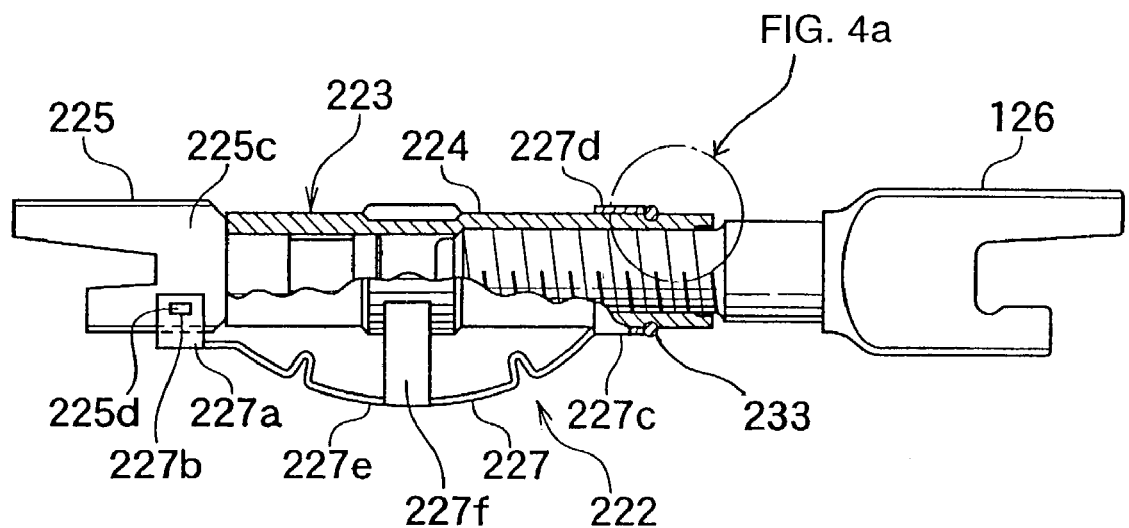
FIG. 4 is a partial cross-section plan view of the automatic shoe clearance adjusting apparatus relating to the second example of the present invention.
Figure 4A:
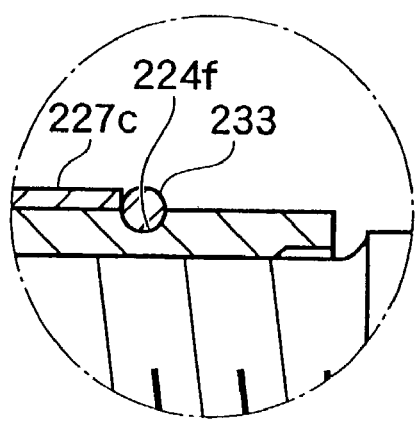
FIG. 4a is a partial enlarged cross-section view of the peripheral groove on the nut member and the spring clip according to the second example of the present invention.
Figure 4B:
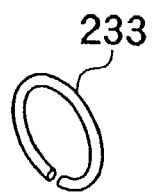
FIG. 4b is a perspective view of the spring clip according to the second example of the present invention.

The second example of the present invention will be explained with reference to FIG. 4. For purposes of explanation of an automatic shoe clearance adjusting apparatus 222 of this example, except for the bolt member 126 of the above-described first example and a newly added spring clip 233 particularly in this example, components with the same functions as described in the above-conventional art will be assigned reference numbers with 200s. Explanation as to operation of the automatic shoe clearance adjustment disabling mechanism will be same as the first example and therefore will be omitted here.

A flat, plated section 225c of a fitting member 225 as a component part of a strut 223 in this second example employs a rectangular projection 225d press-formed thereon instead of the cylindrical projection 125d as shown in the first example. Following the structural difference of the rectangular projection 226d, two facing walls of a U-shaped left end section 227a of the driving member 227 have a rectangular hole 227b to fit the rectangular projection 225d. In this case, without abutting a bottom of the U-shaped end section 227a with a side surface of the flat, plated section 225c, the U-shaped end section 227a may be fixed to the specified position on the flat, plated section 225c of the fitting member 225. However, an engagement section between the fitting member 225 and the driving member 227 is not limited to convex-concave engagement (or fitting engagement between the rectangular projection 225d and the rectangular hole 227b). At least the U-shaped end section 227a of the driving member 227 needs to be securely fixed to the specified portion of the flat, plated section 225c of the fitting member 225, and therefore the engagement section may be noncircular i.e., an oval convex-concave engagement.

A cylindrical coupling 227d on a right end portion of the driving member 227, as in the above-described technology of the first example, is slid to fit onto a peripheral surface of the nut member 224 with a predetermined degree of deflection of an arcuate leaf spring section 227e and a spring clip 233 is fit onto the peripheral groove 224f of the nut member 224 to inhibit the rightward movement of the driving member 227.

This invention should not be considered to be limited to the constructions described in the first and second examples. It will be apparent to a person in the field of art that components of the automatic shoe clearance adjusting apparatus may be substituted as necessary; various modifications may be applied such as indirectly extending a driving member between a nut member and a fitting member. With reference to the PCT published application number WO 94/12805, it will also be apparent that the automatic shoe clearance adjusting apparatus of the present invention may be converted for use with a disc brake.

Figure 5:
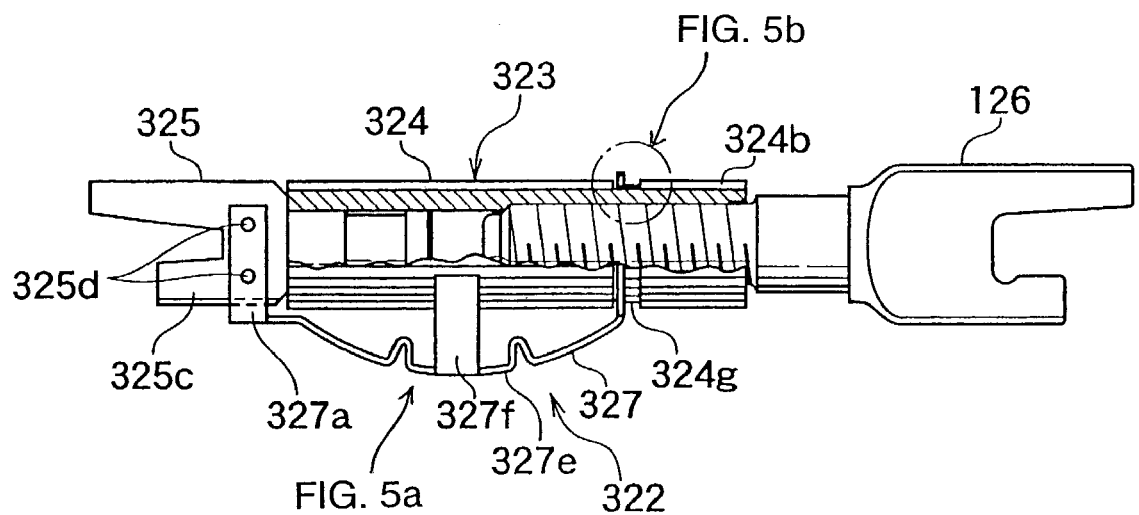
FIG. 5 is a partial sectional plan view of the automatic shoe clearance adjusting apparatus of third example of the present invention.
Figure 5A:
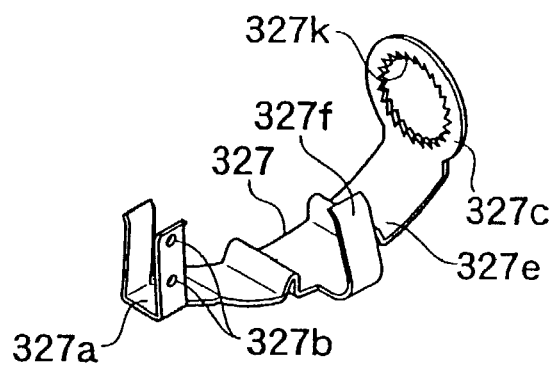
FIG. 5a is a perspective view of the driving member, a component of the automatic shoe clearance adjusting apparatus, before being jointed to the strut relating to the third example of the present invention.
Figure 5B:
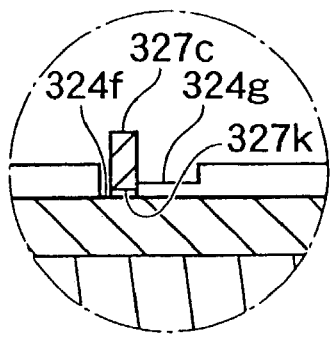
FIG. 5b is a partial enlarged cross-section view of the peripheral groove on the nut member and the right end of the driving member according to the third example of the present invention.

A third example of the present invention is explained with reference to FIG. 5. For the purpose of explaining the automatic shoe clearance adjusting apparatus 322 of this example, components with the same functions as described in the above-described examples will be assigned reference numbers with 300s. Further, operation and advantages of the automatic shoe clearance disabling mechanism would be the same as the first example and as such the explanation is omitted here.

A nut member 324 as a component of a strut 323 has ratchet wheel 324b integrally formed on an entire periphery thereof by withdrawing or extruding and has a peripheral groove 324f formed thereon at slightly right side of the center thereof which is configured In almost the same diameter as a root diameter of the ratchet wheel 324b. As such, a right end 327c of a driving member 327 is bent upward in an almost right angle relative to an axial line of the strut 323, and inner circumferential teeth 327k slide-fittable over the ratchet wheel 324b of the nut member 324 and are formed at a center of the bent disc-like section. The disc-like section is slid from a right side of the nut member 324 to fit over the peripheral groove 324f thereof allowing to make a relative rotation therebetween, and then the ratchet wheel 324b at a right side near the peripheral groove 324f may be forged in at least two different portions with constant intervals therebetween. Forged portions 324g on the ratchet wheel 324b prevent a movement of the right end 327c of the driving member 327 toward right allowing relative rotation of the driving member 327 within the peripheral groove 324f of the nut member 324.

Two cylindrical protuberances 325d, 325d are vertically and integrally formed on a side surface of a flat, plated section 325c of the fitting member 325 with a certain interval therebetween by press. Accordingly, one end surface of the left end portion 327a of the driving member 327 has two circular holes 327b, 327b so as to receive and fix the two cylindrical protuberances 325d of the fitting member 325 therein while deflecting an arcuate leaf spring section 327e of the driving member 327. The cylindrical protuberances 325d and the circular holes 327b are not limited to circular in their shapes, and any effective non-circular shape may be applied. Further, the driving member 327 may have one slotted hole for fixing the fitting member 325.

The present invention is not limited to what was described in the above examples, and it would be obvious to persons in skill in this art to modify the present invention in a various ways such as by applying any effective combination of the components of the automatic shoe clearance adjusting apparatus, using cylindrical member for manufacturing the fitting member, and indirectly extending the driving member between the nut member and the fitting member. In addition, PCT published application number WO 94/12805 discloses a technology to apply the automatic pad clearance adjustment apparatus of the present invention in a disc brake.

The present invention is constructed as described above and has the following advantages.

When the temperature of the arcuate leaf spring section of the driving member exceeds a predetermined degree, an automatic shoe clearance adjustment disabling mechanism suspends the automatic shoe clearance adjusting operation by weakening the resilient force of the spring section upon thermo-deflecting the leaf spring section. Therefore, the problem of the irregular movement of the nut member as explained above can be eliminated and a possibility causing the adverse effect on the shoe-to-drum clearance is completely eliminated.

The automatic shoe clearance adjusting apparatus comprises only four parts, i.e., the nut member, the fitting member, the bolt member and the driving member. Accordingly, the present invention helps to reduce the number of components, which facilitates the components maintenance and assembly task, thereby drastically reducing the costs.

The driving member operating the automatic shoe clearance adjustment by automatically rotating the ratchet wheel of the nut member may be made of bi-metal or the shape memory effect alloy of thermosensitive material. When the temperature of the arcuate leaf spring section of the driving member exceeds a predetermined degree, an automatic shoe clearance adjustment disabling mechanism suspends the automatic shoe clearance adjusting operation by weakening the resilient force of the leaf spring section upon thermo-deflecting the leaf spring section. Therefore, the load range of the spring force may be set higher, no manufacturing precision of the driving member is necessary and there is no possibility causing the adverse effect on other components.

The driving member is formed from a one piece sheet made of bi-metal or shape memory effect alloy by press, thereby facilitating manufacturing and allowing the selection of materials according to a required design specification.

Because the ratchet wheel of the nut member is integrally formed on the nut member with a specified width in a longitudinal direction of the nut member by rolling, or are integrally formed on an entire periphery of the nut member by withdrawing or extruding the same, the manufacturing process is simplified and the diameter of the nut member may be smaller, thereby facilitating brake design.

With respect to an engagement section between the driving member and the fitting member, the U-shaped end section of the driving member is resilient yet securely fixed at the specified position of the flat, plated section of the fitting member with a convex-concave engagement. Therefore, this configuration facilitates the assembly task.

With respect to the engagement section between the driving member and the nut member, the cylindrical coupling of the driving member slides on and fits relatively rotatably onto the peripheral surface of the nut member to be attached at the specified position on the nut member by forging. Therefore, this configuration facilitates the assembly task.

It is readily apparent that the above-described invention has the advantages of wide commercial utility. It may be understood that the specific form of the invention hereinabove described is intended to be representative only, and certain modifications within the scope of those teachings will be apparent to those skilled in the art without departing from the sprit and scope of the invention.

Accordingly, reference should be made to the following claims in determining the full scope of the invention.

What we claim is:

1. An automatic shoe clearance adjusting apparatus for a drum brake of motor vehicles comprising:
   (a) a strut regulating a returning position of a pair of brake shoes and a driving member installed on the strut, said strut including
      (1) a rotatable nut member with a ratchet wheel,
      (2) a non-rotatable fitting member for supporting the nut member at one side portion of the nut member, and
      (3) a non-rotatable bolt member for making a screw engagement with the nut member at the other side portion of the nut member; and
   (b) the driving member, said driving member including
      (1) an arcuate leaf spring element having one end portion fixed to the fitting member and the other end portion rotatably engaged with the nut member and driving a resilient force urging the fitting member and the nut member away from each other in an axial direction of the strut and
      (2) a pawl element having one end integrated with the arcuate leaf spring element and the other end making a ratchet engagement with the ratchet wheel,
   said automatic shoe clearance adjusting apparatus has an automatic shoe clearance adjusting mechanism, for expanding the strut to adjust a shoe-to-drum clearance by unthreading the nut member out from the bolt member when the fitting member and the nut member are separated while the pawl element of the driving member makes a one-way-rotation of the nut member, due to the resilient force of the arcuate leaf spring element of the driving member, when strokes of the brake shoes exceed a predetermined value while releasing an axial force acting on the strut, wherein when a temperature of the arcuate leaf spring element of the driving member exceeds a predetermined degree, the temperature weakens the resilient force of the arcuate leaf spring element due to thermal deflection in the direction to reduce curvature of the arcuate leaf spring while keeping ratchet engagement of the pawl element against the ratchet wheel, thereby suspending an automatic shoe clearance adjusting operation.

2. The automatic shoe clearance adjusting apparatus as claimed in claim 1, wherein
   the driving member is formed from a one piece sheet made of a thermo-sensitive material that has shape memory effects.

3. The automatic shoe clearance adjusting apparatus as claimed in claim 2, wherein
   the driving member is made of bi-metal.

4. The automatic shoe clearance adjusting apparatus as claimed in claim 2, wherein
   the driving member is made of shape memory effect alloy.

5. The automatic shoe clearance adjusting apparatus as claimed in claim 1, wherein
   the driving member has a tube section, which is integrally formed thereon at the other end thereof and fits over a periphery of the nut member and
   said nut member has a peripheral groove formed on the periphery thereof,
   said tube section has a protrusion, which is made by forging so as to fit into said peripheral groove allowing relative rotation therebetween.

6. The automatic shoe clearance adjusting apparatus as claimed in claim 2, wherein
   the driving member has a tube section, which is integrally formed thereon at the other end thereof and fits over a periphery of the nut member and
   said nut member has a peripheral groove formed on the periphery thereof,
   said tube section has a protrusion, which is made by forging so as to fit into said peripheral groove allowing relative rotation therebetween.

7. The automatic shoe clearance adjusting apparatus as claimed in claim 3, wherein
   the driving member has a tube section, which is integrally formed thereon at the other end thereof and fits over a periphery of the nut member and
   said nut member has a peripheral groove formed on the periphery thereof,
   said tube section has a protrusion, which is made by forging so as to fit into said peripheral groove allowing relative rotation therebetween.

8. The automatic shoe clearance adjusting apparatus as claimed in claim 4, wherein
   the driving member has a tube section, which is integrally formed thereon at the other end thereof and fits over a periphery of the nut member and
   said nut member has a peripheral groove formed on the periphery thereof,
   said tube section has a protrusion, which is made by forging so as to fit into said peripheral groove allowing relative rotation therebetween.

9. The automatic shoe clearance adjusting apparatus as claimed in claim 1, wherein the ratchet wheel is integrally formed on an entire periphery of the nut member by withdrawing or extruding.

10. The automatic shoe clearance adjusting apparatus as claimed in claim 2, wherein the ratchet wheel is integrally formed on an entire periphery of the nut member by withdrawing or extruding.

11. The automatic shoe clearance adjusting apparatus as claimed in claim 3, wherein the ratchet wheel is integrally formed on an entire periphery of the nut member by withdrawing or extruding.

12. The automatic shoe clearance adjusting apparatus as claimed in claim 4, wherein the ratchet wheel is integrally formed on an entire periphery of the nut member by withdrawing or extruding.

13. The automatic shoe clearance adjusting apparatus as claimed in claim 9, wherein the driving member has inner circumferential teeth, which are integrally formed thereon at the other end thereof and fits on the ratchet wheel of the nut member, said nut member has a peripheral groove formed on the periphery thereof, said ratchet wheel is fit into said peripheral groove allowing relative rotation therebetween so that a movement of the driving member in a direction toward the other side portion of the nut member is prevented.

14. The automatic shoe clearance adjusting apparatus as claimed in claim 10, wherein the driving member has inner circumferential teeth, which are integrally formed thereon at the other end thereof and fits on the ratchet wheel of the nut member, said nut member has a peripheral groove formed on the periphery thereof, said ratchet wheel is fit into said peripheral groove allowing relative rotation therebetween so that a movement of the driving member in a direction toward the other side portion of the nut member is prevented.

15. The automatic shoe clearance adjusting apparatus as claimed in claim 11, wherein the driving member has inner circumferential teeth, which are integrally formed thereon at the other end thereof and fits on the ratchet wheel of the nut member, said nut member has a peripheral groove formed on the periphery thereof, said ratchet wheel is fit into said peripheral groove allowing relative rotation therebetween so that a movement of the driving member in a direction toward the other side portion of the nut member is prevented.

16. The automatic shoe clearance adjusting apparatus as claimed in claim 12, wherein the driving member has inner circumferential teeth, which are integrally formed thereon at the other end thereof and fits on the ratchet wheel of the nut member, said nut member has a peripheral groove formed on the periphery thereof, said ratchet wheel is fit into said peripheral groove allowing relative rotation therebetween so that a movement of the driving member in a direction toward the other side portion of the nut member is prevented.

* * * * *